United States Patent Office 3,769,257
Patented Oct. 30, 1973

3,769,257
PREPARATION OF SOLUTION POLYMER
MASTERBATCHES
Porter F. Gridley, Andover, James J. Brennan, Jr., Scituate, Frank R. Williams, Quincy, and Erivan Hagopian, Lexington, Mass., assignors to Cabot Corporation, Boston, Mass.
No Drawing. Continuation-in-part of application Ser. No. 75,239, Sept. 24, 1970. This application Feb. 22, 1972, Ser. No. 228,246
Int. Cl. C08c *11/18;* C08d *5/00;* B01d *1/14*
U.S. Cl. 260—41.5 MP                              9 Claims

ABSTRACT OF THE DISCLOSURE

This disclosure relates to a continuous process for the preparation of black masterbatches of solution polymer wherein drying of the rubbery crumb is accomplished by contacting the crumb with a gaseous medium at a temperature and velocity sufficient to aspirate and dry the crumb.

---

This application is a continuation-in-part of copending application Ser. No. 75,239, filed Sept. 24, 1970 and now abandoned.

This invention relates to a process for the preparation of masterbatches comprising rubber and carbon black. In particular, this invention relates to a novel process for the preparation of rubber masterbatches from an organic solvent solution of polymer plus carbon black prepared from a polymer in solvent with carbon black previously slurried in an aqueous or organic solvent. Preferably, the organic solvent is the same as that used in preparing the solution polymer. More particularly, this invention is concerned with a continuous process for preparing masterbatches of rubber and carbon black which entains intimately contacting a slurry mixture of polymer and carbon black with a stream of a gaseous medium maintained at conditions of temperature and velocity sufficient to achieve aspiration of the mixture as well as drying thereof.

The use of carbon black as an additive in the preparation of reinforced rubber has long been known and, accordingly, in the manufacture of a wide variety of rubber articles carbon black is mixed into the rubber material. It is, moreover, known that the carbon black incorporated into the rubbery material should be uniformly dispersed therein in order to impart the desired reinforcement properties, usually indicated by stress strain and abrasion resistance in the vulcanizate prepared from the composition in which the black is contained. The conventional methods utilized for incorporation carbon black into a rubbery material have involved mixing procedures in any suitable equipment such as a roll mill or a Banbury mixer or any intensive mixer. These conventional procedures, while employed on a commercial scale, have been plagued with several disadvantages. For example, a major disadvantage of the intensive mixer technique is the amount of time and power required for milling sufficiently to obtain the essential uniform dispersion of carbon black in the rubbery material. Another disadvantage of such processes is apparent in the separate handling requirements of the polymer, carbon black and extender oil. An undesirable feature of the prior art processes is the high capital investment costs for milling equipment.

Accordingly, it is a primary object of this invention to provide a novel and improved process for the preparation of masterbatches comprising a rubbery material, carbon black and, optionally, an extender oil, in which the attendant disadvantages of the prior art are eliminated.

A more specific object of this invention is to provide a process for preparing masterbatches of carbon black in rubbery materials wherein the carbon black is more uniformly dispersed in the rubbery material in a lesser period of time and at a reduced power requirement for the mixing operation.

A further object of this invention is to provide an improved process for preparing masterbatches of carbon black in rubbery materials wherein drying of the carbon black-rubber slurry mixture is carried out in a manner so as to yield a rubber crumb that is light in weight, dry, non-tacky and amenable to being conveyed by air flow.

Other and different objects, advantages and features of the present invention will become apparent to those skilled in the art upon consideration of the following detailed description and claims.

In accordance with this invention, it has been found that the above and still further objects are achieved by the utilization of a novel and improved process for the preparation of masterbatches of a rubbery material, carbon black and, optionally, an extender oil which results in the production of a rubber crumb that is flake-like in character, more so than conventionally prepared crumbs and the size of which is controllable ranging from a very light, fluffy material to a coarse, more agglomerated material. The masterbatching process of the present invention entails forming a premix of up to 30% by weight of carbon black in either water or an organic solvent, dispersing the black into the solvent, fluidizing the slurry if necessary as, for example, when the carbon black concentration exceeds about 6% by weight of the slurry, metering the slurry, the rubbery material as a latex or a cement plus the extender oil, if any, into an in-line mixer, for example, to achieve thorough blending of the ingredients, drying the full mixture by intimately contacting the mixture with a stream of a gaseous medium such as steam or nitrogen or air maintained at a temperature and velocity sufficient to aspirate the mixture and cause the slurry medium to be flash evaporated from the mixture leaving a dry rubber crumb in a gaseous stream of steam or nitrogen or air, collecting the rubber crumb and recovering the organic solvent.

The organic solvent solutions of polymers suitable for use in the present invention include polymers prepared by solution polymerizable techniques wherein the polymer is in solution and remains in solution during the polymerization process or any polymer which may be prepared by dissolving a solid polymer in an inert organic solvent. Among the polymers suitable for use with the present invention are polymers of olefins such as polyethylene, polypropylene, polyisobutylene, copolymers of ethylene and propylene, ethylene and propylene-containing terpolymers and especially terpolymers of ethylene, propylene and a diolefin, homopolymers of conjugated diolefins such as butadiene, isoprene, octadiene, copolymers of conjugated diolefins and at least one monoethylenically unsaturated monomer such as styrene, acrylonitrile, methyl acrylate, methyl methacrylate, vinyl halides and particularly vinyl chloride, alkyl vinyl ethers including methyl vinyl ether, ethylene, propylene, 1-butene, 1-propene, 1-octene, methyl vinyl ketone, alpha-methyl styrene, para-chlorostyrene and the like.

In practicing the invention it is preferred to employ carbon black in the form of dense, highly compressed pellets which are relatively non-dusting and easy to handle. Generally the concentration of carbon black in the aqueous or organic solvent slurry ranges up to about 30 percent by weight, and preferably ranges from at least 7 to about 20 percent by weight. In the preparation of the masterbatches of carbon black and solution polymer, the amount of carbon black to be incorporated into the rubber compositions is determinative of the amount of carbon black slurry to be utilized. Normally, a useful rubber composition contains from about 10 to about 250 parts by weight of carbon black for each 100 parts by weight of polymer.

Suitable solvents for preparing solutions of polymers are the normally liquid inert organic solvents. For example, the solvents include alkanes such as pentane, heptane, hexane, isooctane, nonane, cycloalkanes such as cyclohexane, methylcyclohexane, cyclooctane and aromatic hydrocarbons such as benzene, toluene, xylene, turpentine, chloroform, carbon tetrachloride, chlorobenzene, and the like. With respect to the solvent utilized in preparing the polymer solution, it is desirable that the solvent used to prepare the polymer solution of the polymer be the same as the solvent used to prepare the carbon black slurry. Furthermore, as is well known to compounders, and if desired, in the practice of the present process, an extender oil may be incorporated into the carbon black-rubbery polymer masterbatches. Representative examples of such extender oils are petroleum distillates, chlorinated hydrocarbons, ethers, ketones, gum turpentine, pine tar, rosin, linseed oil, soybean oil, di-n-hexyl adipate, trioctyl phosphate, terpenes, and any of the other well known naphthenic or aromatic polymer processing oils.

Accordingly, the following is a description in greater detail for accomplishing the method of this invention. A slurry premix system containing the desired amount of carbon black is prepared by charging carbon black and either an aqueous or organic solvent into a stainless steel holding tank wherein the material is wet out by means of agitation such as that provided by an air stirrer. The slurry premix is dispersed by grinding the slurry premix in any suitable colloid type mill, for example, a Morehouse Mill which utilizes a rotor-stator principle of grinding. In carrying out the grinding operation, 120 grit stones and one pass through the mill with a mill setting of 2 mils clearance are usually sufficient conditions to provide a residue of less than 5 percent of material having a size of 44 microns. This is a typical limitation of dispersion quality used in the rubber industry but should not be considered the full and final description of slurry quality. In any event, it is understood that the carbon black slurry dispersion is prepared by subjecting the slurry to conditions of high shear in order to insure a good dispersion of carbon black in aqueous or organic solvent and thereby make possible the preparation of a uniform masterbatch composition. It is also well known that, under such conditions of high shear, carbon black slurries having concentrations of carbon black of high structure or surface area, i.e., greater than 70 $m.^2/g.$, exceeding about 7 percent by weight become highly viscous and are difficult to pump and handle. For example, a slurry comprising 15 to 20 weight percent of an intermediate super abrasion furnace carbon black in water or 20 weight percent of carbon black in hexane, after being dispersed in a Morehouse colloid mill, emerges from the mill exhibiting a viscosity on the order of 400,000 centipoises. Accordingly, as shown in the Medalia et al. patent, U.S. 3,294,733, it is necessary to fluidize the viscous slurry by subjecting the viscous slurry to agitation under conditions of mild shear to thin or reduce the viscosity of the slurry. The mild shear condition, by which is meant a gentle agitation or mixing considerably slower than that needed to disperse the carbon black in an aqueous or organic solvent, may be obtained by means of a paddle mixer rotating at approximately 25 to 50 revolutions per minute, or any other suitable equipment such as propeller stirrers, ribbon mixers, ultrasonic vibrators or the like. The resulting fluidized slurry having a viscosity of about 1500 centipoises, or less, may then be transported to a suitable inline mixer by means of a metering pump of a type which will not produce high shear and thereby cause the slurry to again become viscous. Suitable for use, therefor, are peristaltic type pumps such as a Moyno pump or a Sigma pump which generate mild shear conditions.

The process for mixing the fluidized carbon black slurry with the solution polymer may be carried out in a batchwise fashion wherein the admixing of ingredients is accompanied by vigorous agitation. Alternatively, and in a preferred manner, the thorough blending of fluidized carbon black slurry, solution polymer and, optionally, extender oil is achieved by a continuous process which entails metering, in predetermined amounts, separate streams of fluidized carbon black slurry, solution polymer and extender oil, if desired, by means of suitable metering pumps into an in-line mixer such as a mixer produced by Gifford-Wood, Inc. The resulting blend of solution polymer, carbon black slurry and extender oil, if utilized, is now subjected to a drying treatment in order to allow recovery of carbon black-containing polymers in the form of rubbery crumbs. The drying procedure, according to the method of this invention, comprises intimately contacting the blend of solution polymer and carbon black slurry with a stream of a gaseous medium, maintained at a temperature and velocity sufficient to aspirate the blend and cause the aqueous or organic solvent medium to be flash evaporated from the blend and thereby result in the preparation of a solvent-free rubber crumb suspended in a gaseous stream. It has been found that the utilization of this drying procedure, while not adversely affecting properties of the rubber composition, possesses several definite advantages, namely, controlled size of the rubber crumb and faster production of rubber crumbs having lesser amounts of residual moisture than those dried by conventional steam sparging techniques. The particular means employed for establishing the gaseous stream at high velocity and high temperature, i.e., above the condensation temperature of the gaseous material, may be varied widely. For example, the drying process of this invention can be conveniently carried out by continuously pumping the masterbatch blend peripherally into a stream of a suitable gaseous medium, such as steam, which is travelling at a high velocity. The high velocity may be achieved by passing the gas through any suitable passage, such as a conventional venturi throat, to assure near sonic velocity of the stream of gas. In a preferred mode of operating the drying process of the present invention, the masterbatch blend is pumped peripherally into a stream of steam which has been passed through a pipe having a cross sectional area restricted in a manner so as to result in a flow of steam travelling at approximately 2500 feet per second. The contact time required is that which will enable the gas, maintained at a temperature exceeding the condensation temperature thereof, to effect aspiration of the solution polymer-carbon black slurry blend and to effect a flash evaporation of slurry solvent medium from the blend resulting in the production of a solvent-free and moisture-free rubber crumb. Following removal of the slurry solvent medium, the rubber crumb is entrained and collected by a cyclone type collector. Further processing may include drying by means of a force fan oven at 180° F. to remove residual moisture caused by condensation of the gaseous medium employed on the fine crumb of the masterbatch product and recovery of the solvent by means of condensation techniques.

Furthermore, for many purposes, it may be desirable to incorporate into the rubber masterbatch composition of the present invention other conventional rubber additives. Illustrative of such additives are other reinforcing agents such as titanium dioxide, silicon dioxide, zinc oxide, calcium carbonate, clays, calcium silicate, zinc sulfide, hydrous alumina and calcined magnesia; thermoplastic resins such as polyvinyl chloride, coumarone-indenes, polystyrene, styrene-isobutylene, phenolaldehydes and epoxy resins as compounding substances; vulcanizing agents; vulcanization accelerators; accelerator activators; sulfur curatives; antioxidants; heat stabilizers; plasticizers; and the like. It will be apparent that compositions containing such other additives are within the scope of this invention.

The invention will be more readily understood by reference to the following examples which describe the detailed preparation of representative rubber-carbon black masterbatches. There are, of course, many other forms of this invention which will become obvious to one skilled in the art, once the invention has been fully disclosed, and it will, accordingly, be recognized that these examples are given for the purpose of illustration only, and are not to be construed as limiting the scope of this invention in any way.

EXAMPLE 1

A carbon black slurry comprising 18% by weight of Vulcan 9, a super abrasion furnace black produced and sold by Cabot Corporation, in hexane is prepared by mixing, in a suitable holding tank equipped with means for agitation, 180 grams of the carbon black in dry pelleted form with 820 grams of hexane. The premixed carbon black-containing slurry, while being maintained under conditions of sufficient agitation to prevent settling out of solids, is passed once through a colloid type mill such as a Morehouse Model M colloid mill at a clearance setting of 2 mils to disperse the carbon black into the solvent medium. Such a slurry, if as in the instant situation highly loaded with carbon black, emerges from the colloid mill as a thick, dry paste of extremely high viscosity. The viscosity is reduced by means of mild shear provided by a paddle mixer rotating at approximately 25 to 50 revolutions per minute thereby yielding a highly concentrated fluidized carbon black in hexane slurry. The carbon black slurry is metered by means of a peristaltic type pump, such as a Moyno Model 2M1 pump, to avoid viscosity buildup of the slurry, in the desired amount, which in this instance is an amount sufficient to provide 100 parts of carbon black for each 100 parts of polymer, into a suitable inline mixer tube such as a 2 inch pipe size mixer produced by Gifford-Wood, Inc. To the mixer tube there is also metered as a separate continuous stream, an 8% solution of ethylene-propylene-1, 4-hexadiene terpolymer in hexane to which has been added prior to metering 75 parts per 100 parts of polymer of an extender oil such as Circosol 4240 which is a naphthenic oil sold by Sun Oil Company. If it is desired, the extender oil may be metered to the mixer tube as a separate continuous stream. The ingredients are thoroughly blended in the mixer tube following which the blend of polymer, carbon black in hexane slurry and extender oil is dried. The drying procedure is accomplished by pumping the masterbatch blend peripherally into, and effecting intimate contact with, a stream of a gaseous material, steam in this case, which is maintained at a sufficiently high velocity, for example ,approximately 2500 feet per second, to provide aspiration of the blend and drying thereof. In a preferred embodiment, the gas utilized to accomplish the drying of the blend is, while of course being maintained at a temperature above the condensation point thereof, passed through a pipe having a sufficiently small diameter to assure approximately sonic velocity. In this manner, the hexane solvent is flash evaporated from the blend leaving a solvent-free masterbatch crumb suspended in a gaseous stream of hexane and steam. The solid masterbatch crumb is collected by means of a cyclone collector and is further dried by a force fan oven to remove residual moisture caused by steam condensation. The resultant masterbatch crumb is then blended on a roll mill together with 1 part of sulfur per 100 parts of polymer, 1.5 phr. (parts per 100 parts of rubbery polymer) of tetramethylthiuram monosulfide, 0.75 phr. of mercaptobenzothiazole, 5 phr. zinc oxide and 1 phr. stearic acid. The resulting compound is then cured at 320° F. for 30 minutes and is tested according to the following Table I and compared to a designated control in order to show the various advantages derived. The compounded but not yet vulcanized stock is tested for bound rubber value expressed as grams of polymer bound per gram of carbon black available, Mooney plasticity and extrusion shrinkage. After vulcanization, the vulcanizate is tested for reciprocal swelling in heptane, tensile strength, 300% modulus, elongation and Shore A hardness.

In order to demonstrate the effectiveness of the present masterbatch process which incorporates the novel drying method, a masterbatch slurry containing the same ingredients and in the same quantities, i.e., 100 phr. of ethylene-propylene-1, 4-hexadiene terpolymer in hexane, 100 phr. Vulcan 9 carbon black and 75 phr. Circosol 4240, is prepared as shown above. In this instance, however, the solvent-free masterbatch crumb is prepared by conventional steam sparging coagulation which involves pumping the masterbatch slurry under pressure into the bottom of a large vat of hot water, allowing the material to rise to the top of the vat and discharging a solvent-free, water-wet crumb over the top of the vat. The masterbatch crumb is then collected, dried and utilized in preparing a rubber formulation as above which is cured at 320° F. for 30 minutes. Testing of this vulcanizate is carried out in the normal fashion and the results obtained are disclosed in Table I below.

In a further attempt to establish a standard of comparison there is prepared a dry milled control comprising 100 phr. of ethylene-propylene-1, 4-hexadiene terpolymer, 100 phr. Vulcan 9 carbon black, 75 phr. Circosol 4240, 5 phr. zinc oxide, 1 phr. stearic acid, 1 phr. sulfur, 1.5 phr. tetramethylthiuram monosulfide and 0.75 phr. mercaptobenzothiazole. The blend is cured at 320° F. for 30 minutes. The resulting vulcanizate is tested for conventional properties which are reported in the following Table I.

TABLE I

| | Masterbatch blend | | |
|---|---|---|---|
| | Dried by method of present invention | Control sample dried by steam sparging | Dry milled control |
| Bound rubber (g./g.) | 0.36 | 0.20 | 0.21 |
| Mooney plasticity ML-4' at 212° F | 53 | 43 | 44 |
| Extrusion shrinkage (percent) | 29.1 | 31.7 | 32.7 |
| Reciprocal swelling (in heptane)—30' | 0.249 | 0.231 | 0.239 |
| Tensile strength (p.s.i.)—30' | 2,840 | 2,850 | 2,800 |
| 300% modulus (p.s.i.)—30' | 1,400 | 1,000 | 1,000 |
| Elongation (percent)—30' | 540 | 600 | 580 |
| Shore A hardness—30' | 68 | 63 | 64 |

It will become readily apparent from the foregoing results that the present process for preparing masterbatches of carbon black and solution polymer wherein the novel method of drying the slurry of carbon black and polymer is employed possesses many advantages. For example, the ability to employ high concentration carbon black slurries as well as low concentration carbon black slurries permits a reduction of large volumes of effluent water which must be handled. By means of photomicrographic comparison to the dry mill mixing process, the masterbatch process is found to produce better dispersion as well as to reduce the power requirements necessary to disperse the masterbatched compounds. Moreover, the use of the novel drying method of this invention results in the production of a dry rubbery masterbatch crumb having reduced residual moisture or solvent and controllable crumb size while the properties of masterbatches and vulcanizates prepared from the rubbery cement are not adversely affected.

EXAMPLE 2

Following the procedure of Example 1 and substituting for the carbon black slurry utilized therein a first slurry of 20% by weight of Vulcan 6 carbon black, an intermediate super abrasion furnace black produced and sold by Cabot Corporation, in hexane, and, secondly, a slurry of 5% by weight of Vulcan 6 carbon black in hexane, there are prepared two vulcanizates comprising 100 phr. ethylene-propylene-1, 4-hexadiene terpolymer, 100 phr. carbon black, 60 phr. Circosol 4240 extender oil, 1 phr. stearic acid, 5 phr. zinc oxide, 1.5 phr. sulfur, 1.74 phr. tetramethylthiuram monosulfide and 0.58 phr. mercaptobenzothiazole. The properties obtained on the rubbery vulcanizate resulting from the 20% by weight slurry of carbon black in hexane include a bound rubber value of 0.31 grams of polymer bound per gram of carbon black available, a Mooney plasticity ML–4' at 212° F. of 81, a reciprocal swelling in n-heptane of 0.24, a tensile strength of 2740 p.s.i., a 300% modulus of 1460 p.s.i., and an elongation of 500 percent. The vulcanizate prepared from the slurry of 5% carbon black in hexane possesses a bound rubber value of 0.30 grams of polymer bound per gram of carbon black available, a Mooney plasticity ML–4' at 212° F. of 90, a reciprocal swelling in n-heptane of 0.25, a tensile strength of 2760 p.s.i., a 300% modulus of 1550 p.s.i., and an elongation of 500 percent. An examination of the foregoing results indicates that there are no significant differences in rubber properties of similiar vulcanizates prepared utilizing carbon black slurries of varied concentrations.

EXAMPLE 3

Following the procedure of Example 2, there are prepared vulcanizates employing in lieu of the slurry therein, slurries as shown in Table II below using as the carbon black Vulcan 3 carbon black which is a high abrasion furnace black produced and sold by Cabot Corporation. The vulcanizates comprise 100 phr. ethylene-propylene-1, 4-hexadiene terpolymer, 100 phr. carbon black, 60 phr. Circosol 4240 extender oil, 1 phr. stearic acid, 5 phr. zinc oxide, 1.5 phr. sulfur, 1.74 phr. tetramethylthiuram monosulfide and 0.58 phr. mercaptobenzothiazole. The results obtained on these vulcanizates are given in Table II below.

TABLE II

| | Slurry composition | | | |
|---|---|---|---|---|
| | 5% by wt. Vulcan 3 black in water | 18 % by wt. Vulcan 3 black in water | 5% by wt. Vulcan 3 black in hexane | 18% by wt. Vulcan 3 black in hexane |
| Mooney plasticity ML–4' at 212° F | 69 | 65 | 66 | 70 |
| Extrusion shrinkage (percent) | 44.4 | 48.7 | | |
| Reciprocal swelling in benzene—20' | 0.28 | 0.29 | 0.27 | 0.28 |
| Tensile strength (p.s.i.)—20' | 2,370 | 2,630 | 2,430 | 2,540 |
| 300% modulus (p.s.i.)—20' | 1,060 | 1,000 | 1,100 | 1,020 |
| Elongation (percent)—20' | 580 | 630 | 570 | 590 |
| Shore A hardness—20' | 61 | 61 | 56 | 59 |

A review of the data in the table above clearly shows that there is no effect on vulcanizate properties produced by varying the carbon black concentration of the slurry used, whether the solvent slurry is of an aqueous or organic type.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A process for preparing a masterbatch of solution polymer and carbon black which comprises forming a fluidized slurry of carbon black dispersed in an organic or aqueous solvent medium, mixing the resulting slurry with an inert organic solvent containing a solution of polymer dissolved therein, intimately contacting the resulting masterbatch mixture with a stream of a gaseous medium maintained at a temperature and velocity sufficient to aspirate and dry the mixture whereby there is provided a gaseous stream containing the masterbatch in crumb form, and recovering the masterbatch of solution polymer and carbon black.

2. A process as defined in claim 1 wherein the slurry contains an amount of carbon black ranging up to about 30 percent by weight of the slurry.

3. A process as defined in claim 1 wherein the slurry contains an amount of carbon black ranging from about 7 to about 20 percent by weight of the slurry.

4. A process as defined in claim 1 wherein the slurry is mixed with the polymer solution in an amount sufficient to provide a masterbatch containing from about 10 to about 250 parts by weight of carbon black per 100 parts by weight of polymer.

5. A process as defined in claim 1 wherein the slurry is mixed with the inert organic solvent containing the dissolved polymer in an amount sufficient to provide a masterbatch containing from about 20 to about 80 parts of carbon black per 100 parts by weight of polymer.

6. A process as defined in claim 1 wherein the solution polymer is a terpolymer of ethylene, propylene and 1,4-hexadiene.

7. A process as defined in claim 1 wherein the fluidized slurry comprises carbon black dispersed in an organic solvent medium.

8. A process as defined in claim 1 wherein the gaseous medium is steam.

9. A process as defined in claim 1 wherein the gaseous medium is steam and the velocity of the gaseous medium is about 2500 feet per second.

References Cited

UNITED STATES PATENTS

| 3,449,284 | 6/1969 | Pollock | 260—41.5 R |
| 2,933,480 | 4/1960 | Gresham et al. | 260—80.5 |
| 3,326,858 | 6/1957 | Rapear et al. | 203—40 |

OTHER REFERENCES

Perry's Chemical Engineers' Handbook (4th ed.) (McGraw-Hill) (N.Y.) (1963), pp. 15–44 and 15–45.

ALLAN LIEBERMAN, Primary Examiner

H. H. FLETCHER, Assistant Examiner

U.S.Cl. X.R.

159—16 R, 16 S, DIG. 3, DIG. 10; 203—40; 260—33.6 A, 33.6 PQ, 34.2, 41 R, 41.5 R

UNITED STATES PATENT OFFICE
CERTIFICATE OF CORRECTION

PATENT NO. : 3,769,257

DATED : October 30, 1973

INVENTOR(S) : Porter F. Gridley, et al.

It is certified that error appears in the above—identified patent and that said Letters Patent are hereby corrected as shown below:

Column 1, line 36, "entains" should read --entails--; line 59, "esential" should read --essential--.

Claim 1, line 5, after "solution" delete "of".

Signed and Sealed this

Twenty-fourth Day of August 1976

[SEAL]

Attest:

RUTH C. MASON
Attesting Officer

C. MARSHALL DANN
Commissioner of Patents and Trademarks